United States Patent
Cornelissen et al.

(10) Patent No.: US 11,674,665 B2
(45) Date of Patent: Jun. 13, 2023

(54) LIGHTING DEVICE

(71) Applicant: SIGNIFY HOLDING B.V., Eindhoven (NL)

(72) Inventors: Hugo Johan Cornelissen, Escharen (NL); Olexandr Valentynovych Vdovin, Maarheeze (NL); Ludovicus Johannes Lambertus Haenen, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 121 days.

(21) Appl. No.: 17/419,966

(22) PCT Filed: Feb. 4, 2020

(86) PCT No.: PCT/EP2020/052671
§ 371 (c)(1),
(2) Date: Jun. 30, 2021

(87) PCT Pub. No.: WO2020/161097
PCT Pub. Date: Aug. 13, 2020

(65) Prior Publication Data
US 2022/0065425 A1    Mar. 3, 2022

(30) Foreign Application Priority Data
Feb. 8, 2019 (EP) .................................... 19156126

(51) Int. Cl.
*F21V 5/00* (2018.01)
*F21V 11/14* (2006.01)
*G02B 27/30* (2006.01)
*F21Y 115/10* (2016.01)
*F21Y 105/10* (2016.01)
*G02B 30/27* (2020.01)

(52) U.S. Cl.
CPC .............. *F21V 5/007* (2013.01); *F21V 11/14* (2013.01); *G02B 27/30* (2013.01); *F21V 5/004* (2013.01); *F21Y 2105/10* (2016.08); *F21Y 2115/10* (2016.08); *G02B 30/27* (2020.01)

(58) Field of Classification Search
CPC ......... F21V 5/007; F21V 11/14; G02B 27/30; G02B 30/27
See application file for complete search history.

(56) References Cited

U.S. PATENT DOCUMENTS

| | | | |
|---|---|---|---|
| 2011/0228231 A1* | 9/2011 | Schreiber | G03B 21/14 353/30 |
| 2015/0330607 A1* | 11/2015 | Di Trapani | G02B 6/0046 362/296.1 |
| 2016/0010811 A1 | 1/2016 | Benitez et al. | |
| 2016/0265733 A1* | 9/2016 | Bauer | F21S 41/16 |
| 2017/0153004 A1* | 6/2017 | De Zwart | F21V 14/06 |

* cited by examiner

*Primary Examiner* — Oluseye Iwarere
*Assistant Examiner* — Michael Chiang

(57) ABSTRACT

A lighting device (1) comprising a light generating element (2; 3), and a micro-lens array (4) comprising a focal plane ($F_p$), wherein the light generating element (2; 3) is arranged to emit a light output towards the micro-lens array (4), wherein the lighting device (1) comprises an array of micro-logos (81-83), and wherein the array of micro-logos (81-83) is located in the focal plane ($F_p$) of the micro-lens array (4).

13 Claims, 7 Drawing Sheets

LIGHTING DEVICE

CROSS-REFERENCE TO PRIOR APPLICATIONS

This application is the U.S. National Phase application under 35 U.S.C. § 371 of International Application No. PCT/EP2020/052671, filed on Feb. 4, 2020, which claims the benefit of European Patent Application No. 19156126.5, filed on Feb. 8, 2019. These applications are hereby incorporated by reference herein.

FIELD OF THE INVENTION

The present invention relates to lighting devices for mimicking a moving light source at different viewing angles. More particularly, the present invention relates to a lighting device comprising a light generating element and a micro-lens array comprising a focal plane.

As used herein, the expression aperture pitch is intended to refer to the distance between the centers of two neighboring light extraction elements in the form of apertures in an array of apertures.

As used herein, the expression micro-lens pitch is intended to refer to the distance between the centers of two neighboring lenses in a micro-lens array.

As used herein, the expression micro-logo pitch is intended to refer to the distance between the centers of two neighboring logos in a micro-logo array.

As used herein, the term light source is intended to be interpreted broadly and to encompass not only "real" light sources such as LEDs, but also "virtual" light sources such as light extraction structures in a light guide, and apertures and/or light extraction elements in a layer.

BACKGROUND OF THE INVENTION

Within lighting devices there is a hardly explored category of lighting devices with mixed functionality of illumination and surprising visual appearance. Particularly, it is suggested that looking to the lighting device light source itself, i.e. the luminance distribution of the light source, can contribute to a natural experience of light. Thereby e.g. daylight or sunlight may be mimicked. The virtual presence of a sun-like light source provides a feeling of comfort, like a natural environment.

An example of an existing such lighting device simulating a natural light source is the lighting device marketed under the name CoeLux 45HC by company CoeLux. This lighting device is a ceiling lighting device which creates an intense directional beam of white light plus a low-brightness diffuse blue area mimicking a blue-sky effect.

The data sheets available on the CoeLux HC series, however, reveals clearly that this lighting device is a very complicated and high-priced system that has not really found its way to the market (except e.g. in hospitality). The total thickness (build-in depth) of a 45HC system for a 0.5 m² light source is 0.7 m, with a total weight of 300 kg. The installation (hidden) surface is much larger than the source: 2.3×1.7 m. Large luminous affordable areas are therefore difficult to realize with this type of systems.

It is therefore the ambition of the present invention to define concepts that offer comparable light effects embedded in a standard-like lighting device at a reasonable price point, with low weight and limited thickness (in the cm range).

US 2011/228231 A1 discloses a projection display with a light source and regularly-disposed optical channels. The optical channels comprise a field lens to which an object structure to be imaged and a projection lens are assigned. The distance of the projection lenses from the assigned object structures corresponds to the focal distance of the projection lenses whilst the distance of the object structures to be imaged from the assigned field lens is chosen such that a Köhler illumination of the assigned projection lens is made possible. Then the individual projections are superimposed to form the total image.

US 2016/265733 A1 discloses a microprojection light module for a motor vehicle headlight. The module has a light source and a projection arrangement, which images the light exiting from the light source into a region in front of the motor vehicle in the form a light distribution. The projection arrangement has an entry optics, which consists of an array of micro entry optics, and an exit optics, which consists of an array of micro exit optics. Each micro entry optics is paired with exactly one micro exit optics. The micro entry optics are formed in such a way and/or the micro entry optics and the micro exit optics are arranged relative to one another in such a way that the light exiting from a micro entry optics enters precisely only into the paired micro exit optics. The light pre-shaped by the micro entry optics is imaged by the micro exit optics into a region in front of the motor vehicle as at least one light distribution. US 2016/0010811 A1 describes a lighting device including a mixing chamber having an array of apertures in one wall, a light source to supply light into the mixing chamber, and an array of optical elements outside the mixing chamber, each optical element positioned to cooperate with a respective one of the apertures to emit light from the mixing chamber as a beam. The shape, size, and/or direction of the output light beam are controllably varied by controlling the shape, size, and/or position of each aperture relative to its associated optical element.

However, such lighting devices are meant to generate a strong directional beam of light which is not meant to directly look into.

Furthermore, there is a vast choice in ceiling panel luminaires on the market. For manufacturers it is therefore difficult to distinguish themselves from the competition. A similar situation prevails for suspended luminaires, although the design freedom is a bit larger than in the case of the unobtrusive ceiling panels. A solution is of course to print the name of the manufacturer on the luminaire, but this is considered obtrusive and is not appreciated by the customer. There is thus a need for an unobtrusive, more subtle and surprising way to show the name or logo of the manufacturer, in order to show the brand of the luminaire.

By the same token, restaurants, hotels or retail store chains often express their brand image by logos and color schemes of their interiors. There is a need for an unobtrusive, subtle and surprising way to add to the experience of the visitor and enhance the brand image of the hotel or retail chain.

Hence, there is a desire to provide a lighting device with which an unobtrusive, subtle and surprising way to add to the experience of the user, consumer and/or visitor and enhance the brand image of the manufacturer and/or the hotel or retail chain is provided for.

Furthermore, there is a desire to provide such a lighting device with which a virtual image is also created closer to its surface as compared to prior art solutions and which allows observing the effect in a wider viewing range, and which defines concepts that offer comparable light effects embedded in a standard-like lighting device at a reasonable price point, with low weight and limited thickness.

SUMMARY OF THE INVENTION

It is an object of the present invention to overcome this problem, and to provide a lighting device with which an unobtrusive, subtle and surprising way to add to the experience of the user, consumer and/or visitor and enhance the brand image of the manufacturer and/or the hotel or retail chain is provided for.

A further object of the present invention is to provide such a lighting device with which a virtual image is created closer to its surface as compared to prior art solutions and which allows observing the effect in a wider viewing range, and with which concepts are defined which offer comparable light effects embedded in a standard-like lighting device at a reasonable price point, with low weight and limited thickness.

According to a first aspect of the invention, this and other objects are achieved by means of a lighting device comprising a light generating element and a micro-lens array comprising a focal plane, where the light generating element is arranged to emit a light output towards the micro-lens array. The light generating element comprises any one of or both of a first light generating component and a second light generating component. The first light generating component comprises a light emitting surface adapted for providing a diffuse light output component. The second light generating component comprises at least one array of light sources adapted for providing a directional light output component. The light output is formed by any one of the diffuse light output component, the directional light output component and a superposition of the diffuse light output component and the directional light output component, respectively. The lighting device further comprises an array of micro-logos located between the light generating element and the micro-lens array, and where the array of micro-logos is located in the focal plane of the micro-lens array.

By providing a lighting device which comprises an array of micro-logos, and where the array of micro-logos is located in the focal plane of the micro-lens array, a lighting device with which an unobtrusive, subtle and surprising way to add to the experience of the user, consumer and/or visitor and enhance the brand image of the manufacturer and/or the hotel or retail chain is provided for.

Furthermore, with such a lighting device a virtual image is created closer to its surface, such a lighting device allows observing the effect in a wider viewing range, and with such a lighting device concepts are defined which offer comparable light effects embedded in a standard-like lighting device at a reasonable price point, with low weight and limited thickness.

In an embodiment, the lighting device comprises at least two arrays of micro-logos with mutually different micro-logo pitches, $p_{Mi}$, where i denotes the number of the array of apertures and i is an integer being 1 or more.

By providing more than one array of micro-logos, the resulting virtual images of the logos will, when viewed by a person looking at the lighting device, seem to be present at different depths behind the lighting device. This in turn provides a strong 3D effect and thus also a higher degree of detail in the image without compromising the compactness and low weight of the lighting device.

In an embodiment, the micro-lens array comprises a micro-lens pitch, $p_L$, wherein the array, or each array, of micro-logos comprises a micro-logo pitch $p_{Mi}$, and wherein the micro-logo pitch, or each of the micro-logo pitches, is equal to or smaller than the micro-lens pitch.

Thereby, the virtual image of the micro-logos will appear to the viewer as floating at different depths, thus providing a different but likewise strong 3D effect.

The light generating element comprises either a first light generating component or a second light generating component, where the first light generating component comprises a light emitting surface adapted for providing a diffuse light output component, where the second light generating component comprises at least one array of light sources adapted for providing a directional light output component, and where the light output is formed by either the diffuse light output component or the directional light output component, respectively.

Having a light generating component adapted for providing a diffuse light output component is advantageous in that of the output of the lighting device, i.e. the virtual logo, will be more uniform in terms of brightness, and that the virtual logos may have similar brightness as compared to the background.

Having a light generating component adapted for providing a directional light output component is advantageous in that brightness of the output of the lighting device, i.e. the virtual logo, will be increased as more light is emitted within the acceptance cone of the micro-lenses of the micro-lens array.

The light generating element may comprise both a first light generating component and a second light generating component, where the first light generating component comprises a light emitting surface adapted for providing a diffuse light output component, where the second light generating component comprises at least one array of light sources adapted for providing a directional light output component, and where the light output is formed by a superposition of the diffuse light output component and the directional light output component.

By providing such a light generating element, both of the above-described advantages may be obtained simultaneously.

In a further embodiment, the at least one array of light sources comprises the array of micro-logos.

Thereby, a light emitting device being of a particularly simple and robust structure is provided for while still achieving the above-mentioned advantages. In an embodiment, the lighting device further comprises a light blocking structure configured and arranged to suppress cross-talk.

Thereby the cross-talk images of the micro-logos produced by the lighting device may be suppressed, thus creating a cleaner image.

In an embodiment, the lighting device is configured to provide switchable polarized light, and the micro-logo array is a polarization sensitive micro-logo array.

In a particular embodiment, the lighting device further comprises an optical element configured and arranged to provide switchable polarized light, and the micro-logo array is a polarization sensitive micro-logo array.

Thereby, the virtual image of the micro-logos may be switched on and off depending on the polarization of the light provided by the lighting device.

In an embodiment, the at least one array of light sources comprises a transparent element with the array of micro-logos formed thereon.

Thereby a lighting device being of a particularly simple and robust structure is provided for while still achieving the above-mentioned advantages.

The transparent element may for instance be a transparent sheet, layer or block, thereby providing for a lighting device having a very simple construction.

In an embodiment, the lighting device further comprises an array of micro-LEDs or mini-LEDs, and each micro-LED or mini-LED of the array of micro-LEDs or mini-LEDs are covered with a logo or are shaped as a logo, the array of micro-LEDs or mini-LEDs thus forming the micro-logo array.

The use of LEDs as an image source provides for an increased brightness of the virtual image of the micro-logos. Furthermore, the use of micro-LEDs also enables the display of dynamic, e.g. dynamically changing, logos.

In an embodiment, the first light generating component is a transparent light guide, where at least a part of the transparent light guide is made of a scattering material.

Thereby, an alternative lighting device with a particularly simple construction achieving the above-mentioned advantages is provided for.

In an embodiment, the lighting device further comprises at least one light source adapted for, in operation, emitting light, where the first light generating component comprises a light mixing element in which the at least one light source is arranged, where the light emitting surface is a cover layer forming part of light mixing element, the cover layer being arranged downstream of the at least one light source, where the micro-lens array is arranged downstream of the cover layer, and where the cover layer of the light mixing element is a diffusely transparent layer.

Thereby, a lighting device with a particularly simple construction achieving the above-mentioned advantages is provided for.

In an embodiment, the at least one light source is arranged at a position in the light mixing element opposite to the cover layer, and the at least one light source is covered with a diffusive layer.

Thereby, a lighting device with which a more even spread of the light emitted by the at least one lighting device, and thus of the individual micro-logos in the image, is provided for.

In an embodiment, the micro-logos of the array of micro-logos comprise at least two mutually different shapes. In an additional or alternative embodiment, the micro-logos of the array of micro-logos comprise at least two mutually different sizes. Thereby, a further enhanced and improved 3D effect is provided for.

In an embodiment, the cover layer comprising an array of light extraction elements is a semi-transparent collimating element comprising a collimating glass element.

Thereby, an improved control of the angular spread of the light emitted by the at least one light source is provided for.

In an embodiment, the micro-lens array is covered by a transparent light guide, the transparent light guide forming the first light generating component, the transparent light guide is side illuminated by means of LEDs emitting blue light, and the array of light sources is an array of specular light extraction elements comprising the array of micro-logos.

Thereby, an alternative lighting device with a particularly simple construction achieving the above-mentioned advantages is provided for.

In an embodiment, the first light generating component is a transparent light guide, wherein at least a part of the transparent light guide is made of a scattering material, wherein the transparent light guide is side lit, and wherein the array of light sources is an array of light out-coupling structures arranged on the transparent light guide and comprising the array of micro-logos.

Thereby, another alternative lighting device with a particularly simple construction achieving the above-mentioned advantages is provided for.

Also, providing such a transparent light guide provides for a lighting device which may provide further lighting effects. A further advantage of such a light guide is that color and amount of the background light can be varied. Normally, a homogeneous color is required but for this application the color may vary a bit, thus mimicking a blue sky and some clouds. The thus obtained sun-like light will pass this very slightly scattering material without too much scatter of its beam because it sees only a few mm of material. Light coupled in from the side sees 100-1000 mm of this material which is sufficient for out-coupling.

The transparent light guide may be made of a scattering material. The transparent light guide may be side illuminated by means of LEDs emitting blue light. A suitable light guide for this embodiment is an EndLighten sheet or light guide of the type sold by Evonik company. Thereby, a lighting device which may provide the lighting effect of a blue sky or similar is provided for.

The present invention also relates to a lighting device being or being used as any one of a luminaire, an office ceiling lighting device, a wall lighting device, a hospitality lighting device, a retail lighting device, a lighting device configured for confined spaces outside view, such as in corridors and elevators, and for advertising purposes, showing the features of an AD campaign, or dynamically changing text.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
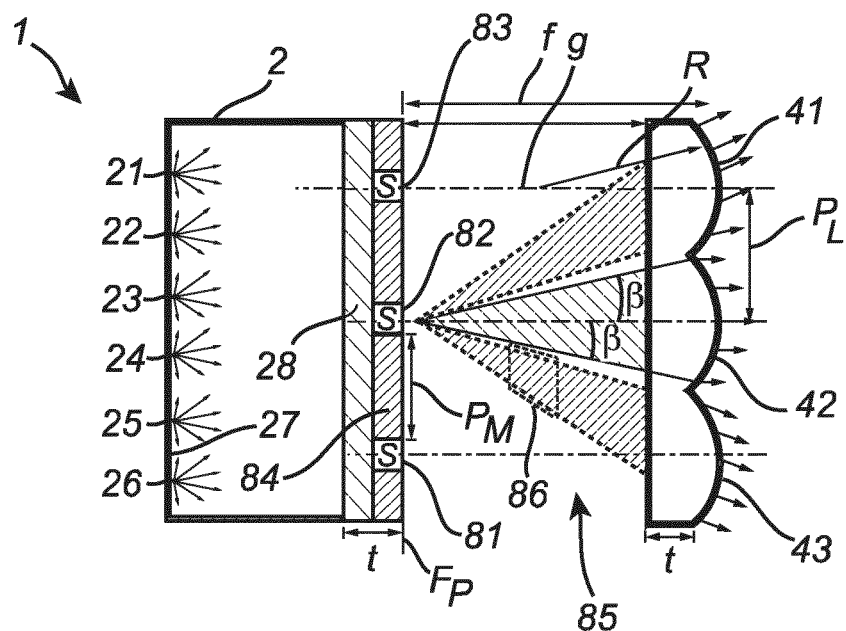
FIG. 1 shows a cross-sectional view of a first embodiment of a lighting device according to the invention.
Figure 2:
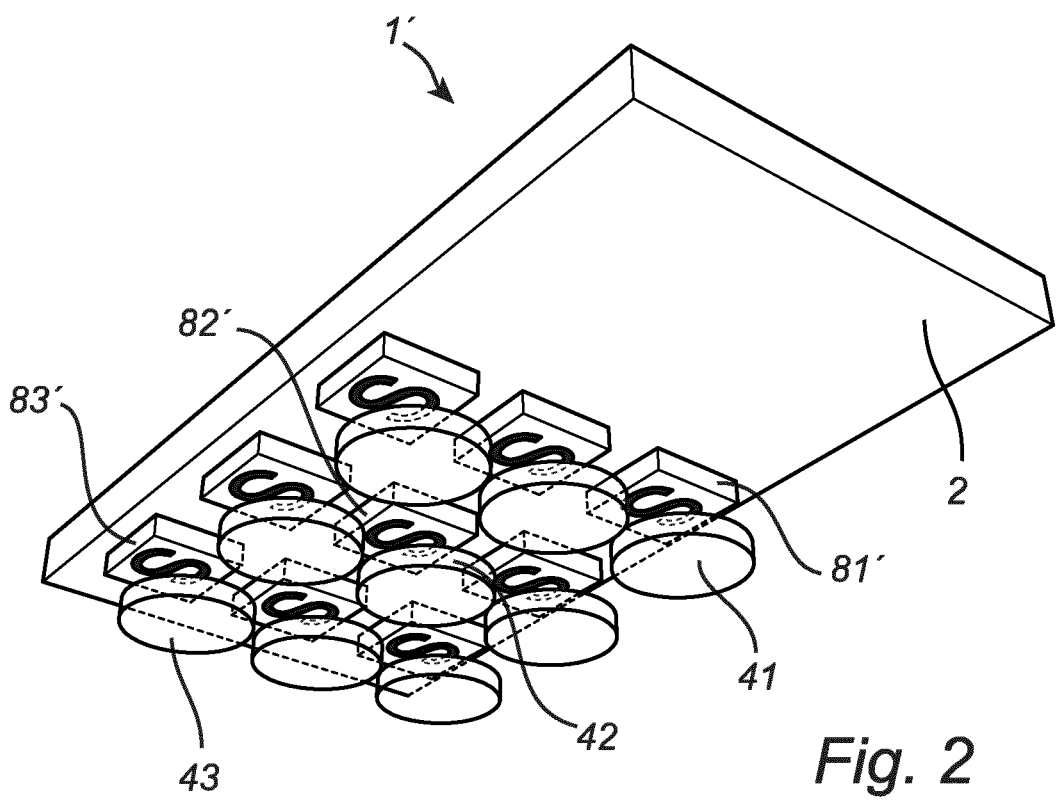
FIG. 2 shows a perspective and simplified view of the lighting device according to FIG. 1.
Figure 3:
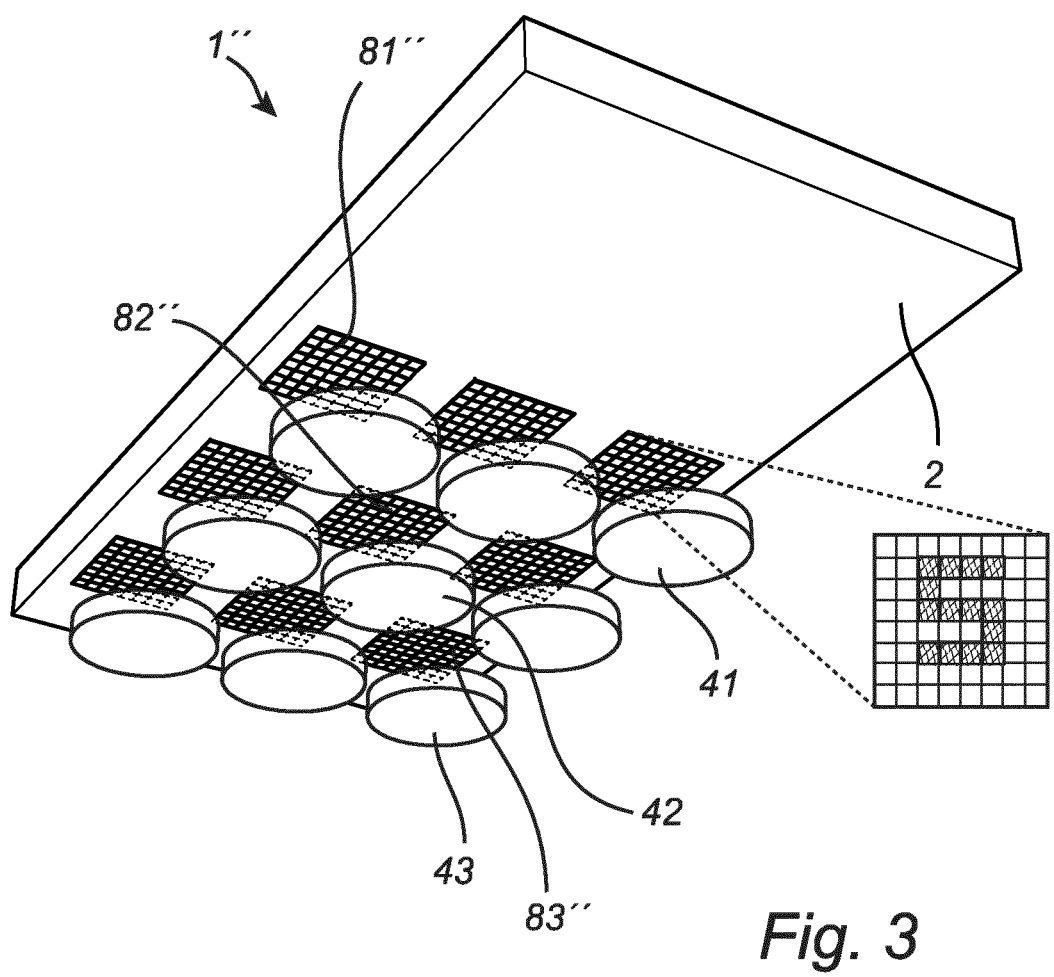
FIG. 3 shows a perspective and simplified view of a further embodiment of a lighting device according to FIG. 1.

FIG. 1 shows a cross-sectional view lighting device 1 according to a first embodiment of the invention. FIG. 2 shows a perspective and simplified view of a lighting device 1' being a slightly altered version of the lighting device according to FIG. 1. FIG. 3 shows a perspective and simplified view of a lighting device 1" being another slightly altered version of the lighting device according to FIG. 1.

Generally, and irrespective of the embodiment, the lighting device comprises a light generating element and a micro-lens array 4. Generally, and irrespective of the embodiment, the lighting device further comprises an array of micro-logos 81-83.

Also, and still generally and irrespective of the embodiment, the array of micro-logos 81-83 are arranged between the light generating element and the array of micro-lenses 4, and furthermore in the focal plane $F_P$ of the micro-lens array 4, for instance such that the plane of the array of micro-logos 81-83 coincides with the focal plane $F_P$ of the micro-lens array 4.

The micro-logos of the array of micro-logos 81-83 are arranged with a micro-logo pitch, $p_M$. In some embodiments, the micro-logo pitch, $p_M$, is smaller than a pitch, $p_L$, of the micro-lens array. By way of a non-limiting example, the micro-lens pitch, $p_L$, may be 3 mm and the micro-logo pitch, $p_M$, may be smaller than 3 mm, for instance 2 mm. However, in the embodiments shown on FIGS. 1 to 3, the micro-lens pitch, $p_L$, and the micro-logo pitch, $p_M$, are of the same size.

The light generating element may further optionally comprise a first light generating component 2, the first light generating element comprising a surface 28 providing a diffuse light output component, and/or a second light generating component 3, the second light generating component comprising an array of light sources 31-33 generating a directional light output component. The light generating element of the lighting device 1 is thus in this arranged to emit a light output being formed as a diffuse light component, a directional light component or a superposition of the diffuse and directional light output components as the case may be. Furthermore, the light generating component 3 or the array of light sources 31-33 may comprise or consist of the array of micro-logos 81-83.

The micro-logos of the array of micro-logos 81-83 may further be arranged on the first light generating component 2. For instance, and as shown in FIG. 1, the first light generating component 2 may comprise or be a transparent sheet 84, surface or block onto which micro-logos of the array of micro-logos 81-83 are printed.

The micro-logos of the array of micro-logos 81-83 are further arranged in a distance from the micro-lens array 4 such that a gap 85 having a size g (FIG. 1) is formed between the array of micro-logos 81-83 and the micro-lens array 4. The size of the gap 85, or the distance between the array of micro-logos 81-83 and the micro-lens array 4, denoted g in FIG. 1 may have any suitable size ensuring that the array of micro-logos 81-83 are arranged in the focal plane FP of the micro-lens array. By way of a non-limiting example, the size g of the gap 85 may be 10 mm.

The micro-logos of the array of micro-logos 81-83 may be formed and/or shaped in any feasible manner, such as but not limited to letters or numbers or images or image parts or any combination thereof, for instance such that the micro-logos are individual letters or images or image parts together or in groups forming a particular logo, or such that each micro-logo forms the same logo or different logos.

The array of micro-logos 81-83 may be a linear array, as may be visualized looking at FIG. 1, or a two-dimensional array as shown in FIG. 2 in which the array of micro-logos 81'-83' is an array of 3×3 micro-logos. Each micro-logo of the array of micro-logos may also be formed of an array of mini- or micro-LEDs 81"-83" as shown in FIG. 3. In principle, any size of array, whether the micro-logo array or the mini- or micro LED array, may be feasible.

The micro-lens array 4 is arranged, when seen in a direction of propagation of the light emitted by the at least one light source 21-26, in front of the cover layer 28 or downstream of the cover layer 28. Furthermore, the array of micro-lenses 4 comprises one micro-lens 41-43 for each micro-logo 81-83, as is illustrated in all of FIGS. 1-3.

In the following, and referring particularly to FIG. 1, an exemplary specific lighting device according to the invention is described. As schematically shown in FIG. 1, an array of micro-logos 81-83 with pitch $p_M$ are arranged on an existing luminaire 2, such as a light box or light guide, with a diffuser 28 and a transparent layer 84. Then follows a micro-lens array 4 with a pitch $p_L$. An air gap 85 ensures that the array of micro-logos 81-83 are arranged in the focal plane $F_P$ of the micro-lenses 41-43. In this example, the micro-lenses 41-43 have a radius of curvature, R, of 6.23 mm, a pitch, $p_L$, of 3 mm and a substrate thickness, t, of 2.5 mm. The air gap 85 has a size g of approximately 10 mm. The transparent "S" in the micro-logo array 81-83 is approximately 1 mm tall. Light from the light emitting sources 21-26 is emitted within a full width at half maximum (FWHM) of $\beta=\pm7°$ (central cone in FIG. 1) on the optical axis of a micro-lens and is collected and collimated. The micro-logo array 81-83 is imaged at minus infinity by the micro-lens array 4 because it is in the focal plane of the micro-lens array 4. An observer that looks at the lighting device will see a floating enlarged image of the logo when looking straight into the lighting device (along the surface normal).

Light emitted by the lighting device at angles larger than $\beta=\pm7°$ is captured and collimated by a neighboring lens, indicated by the upper and lower cones in FIG. 1. This generates an array of "cross-talk" images and broadens the visibility range of the effect. This cross talk may be eliminated fully or partly by arranging an optional light blocking structure 86 (shown with dashed lines in FIG. 1) in the gap 85.

An enlarged image of the micro-logos 81-83 thus appears when the lighting device is observed at a specific angle, here along the surface normal. The virtual image seems to move along when the observer viewpoint moves.

In an experiment conducted with a lighting device according to the invention, the micro-logos 81-83 were 1 mm tall, and the micro-lenses had a focal distance, f, of about 12 mm. In the experiment there were 33×33 micro-lenses in the micro-lens array used, totalling a 100×100 mm area. The virtual image that appeared, standing with a camera at about 400 mm from the lighting device, had a height of about 33 mm as estimated from an image taken with the camera. The size of the virtual logo, S, is given by the relation S=V*d/f, with V being the viewing distance, d the height of the individual micro-logo in the micro-logo array, and f the focal distance of the individual micro-lens in the micro-lens array.

In some embodiments, additional images, so-called cross-talk images, may appear as also discussed above. Light emitted at an angle from the luminaire passes a micro-logo and is collimated by a micro-lens that is not directly above, or closest to, the micro-logo. A virtual image is formed under an angle as indicated in the figures. In this case, an array of logos appears, where the central logo is sharp, and the peripheral logos are blurry due to the limited quality of the micro-lenses. The cross-talk images, i.e. the peripheral blurry logos, can be suppressed by providing a light blocking structure 86 that blocks the light beams forming the cross-talk images.

Also, in some embodiments (cf. e.g. FIG. 2), switchable polarized light is generated in the lighting device 1', and the micro-logo array 81'-83' is a polarization sensitive micro-logo array. Thereby, a logo which may be switched on and off can be realized. For instance, if the lighting device generates left-hand polarized light, switchable to right-hand polarized light, the micro-logo can be made of cholesteric liquid crystalline paint. This material transmits light of a certain color and circular polarization, while reflecting the complementary light. In another example the lighting device generates linearly polarized light, switchable from S- to P-state. A mini-logo array is made from reflective polarizer foil (DBEF from 3M). In one polarization state, all light will be transmitted by the mini-logo array and the logo will not be visible. In the orthogonal polarization state, the mini-logo array will reflect the light and the logo will be visible as a dark image.

In the following, further embodiments of a lighting device according to the invention will be described with reference to FIGS. 4-13. It is noted that for the sake of simplicity, FIGS. 4-12 do not show any micro-logo array.

Figure 4:
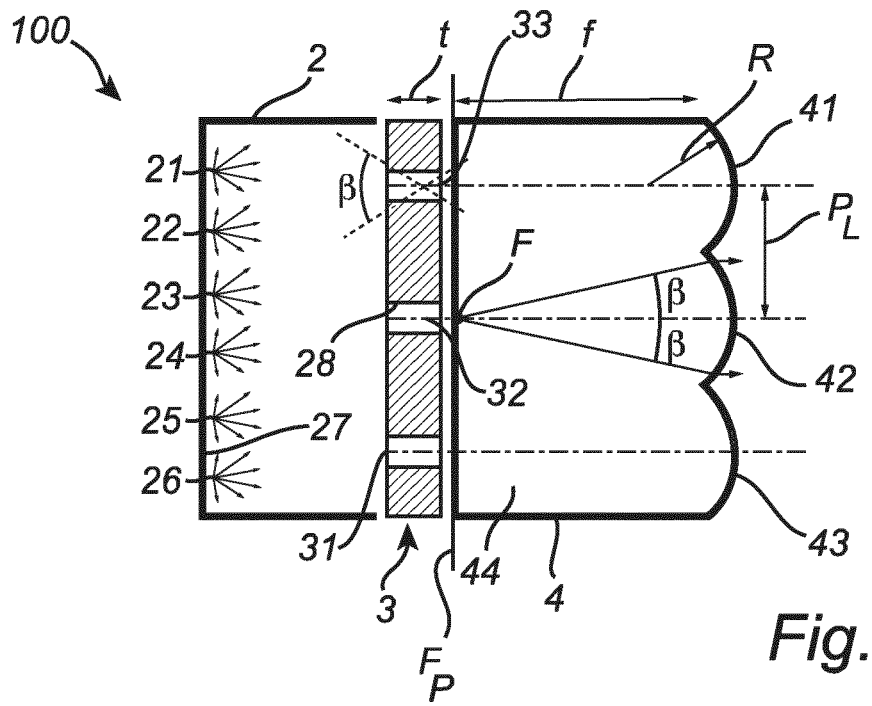
FIG. 4 shows a cross-sectional view of a second embodiment of a lighting device according to the invention.

FIG. 4 shows a lighting device 100 according to a second embodiment of the invention. In the particular embodiment shown in FIG. 4, like in those described above in relation to FIGS. 1-3, the lighting device 100 comprises at least one light source 21-26, typically being LEDs. More particularly, in the specific example of FIG. 4, six light sources 21-26 are provided for. The light sources 21-26 are adapted for, in operation, emitting light in a direction of emission. The direction of emission or the direction of propagation of the light emitted by the at least one light source 21-26, is generally towards the array of light extraction elements 3 and the micro-lens array 4. The light sources 21-26 may be covered partially or fully with a diffusive layer or coating. A light guide with light sources at its edges and light extraction elements at its surface may also serve as a mixing element.

Generally, and irrespective of the embodiment, the light sources may be LEDs, such as LEDs of the same color or of one or more different colors, or LEDs the same color temperature or with different correlated color temperatures.

The lighting device 100 of FIG. 4 differs from those of FIGS. 1-3 in that the first light generating component 2 is a light mixing element 2, which is typically provided as a chamber in the form of a box comprising a bottom surface or wall 27 and a cover layer 28. The wall 27 and the cover layer 28 are mutually opposite parts of the light mixing element 2. The light sources 21-26 are arranged in the light mixing element 2 at the wall 27 opposite to the cover layer 28. The cover layer 28 is arranged, when seen in the direction of propagation of the light emitted by the at least one light source 21-26, in front of the at least one light source 21-26. The bottom surface or wall 27 may be reflective or provided with a reflective coating or film or surface layer. Alternatively, the first light generating component 2 may be a light guide.

The cover layer 28 is a diffusely transparent layer. The cover layer 28 comprises a thickness t. The cover layer 28 comprises at least one array of apertures 31-33 therein. Thus, the array of light sources 3 comprise both an array of micro-logos (not shown in FIG. 4) and the at least one array of apertures 31-33 forming light extraction elements 3. The light extraction elements 3 may also be other suitable light extraction features than apertures. Especially, when the first light generating component 2 is a light guide, the second light generating component, or the light extraction elements, can be specular light extraction elements or features.

The diffusely transparent part of the cover layer 28 is thus adapted for providing a diffuse light output component and the at least one array 3 of apertures 31-33 is adapted for providing a directional light output component. The at least one array 3 of apertures comprises an aperture pitch, $p_A$. The cover layer 28 may additionally or alternatively be a reflective layer. Such a reflective layer may be provided to enhance the efficiency of the light generation.

The array 3 of apertures may have the same shape, such a circular, oval or rectangular or any other shape. Alternatively, the array 3 of apertures may comprise apertures with different shapes, such a circular, oval or rectangular or any other shape or combination thereof. Alternatively, or additionally, the array of apertures 3 may comprise apertures with different sizes.

Figure 5:
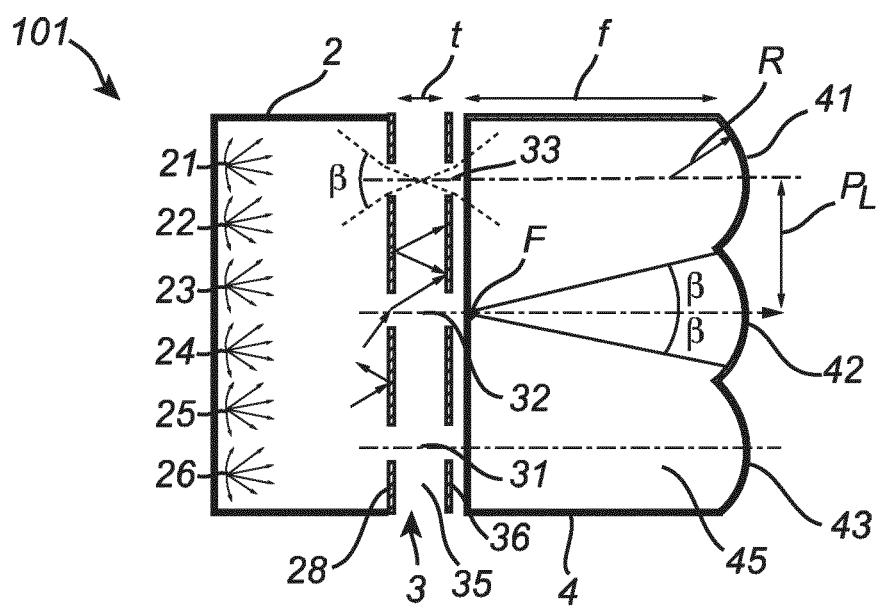
FIG. 5 shows a cross-sectional view of a third embodiment of a lighting device according to the invention.

The micro-lens array 4 comprises a plurality of micro-lenses 41-43. The micro-lens array 4 is arranged, when seen in a direction of propagation of the light emitted by the at least one light source 21-26, in front of the cover layer 28 or downstream of the cover layer 28. The micro-lens array 4 comprises a micro-lens pitch, $p_L$. Each micro-lens 41-43 comprises a radius of curvature R. The micro-lens array 4 may be made of a suitable glass material 44 (FIGS. 4 and 6) or polymer material 45 (FIG. 5). The micro-lens array 4 further comprises a focal distance f, a focal point F and a focal plane $F_P$, in which the focal point F is situated. The light extraction elements 31-33 may be arranged in the focal plane $F_P$ of the micro-lens array 4, i.e. such that the plane of the light extraction elements 31-33 coincide with the focal plane $F_P$ of the micro-lens array 4.

The light mixing element 2 is in other words covered by a diffusely transparent sheet 28 with an array of tiny light extraction elements 31-33 in the form of apertures. The light extraction elements 31-33 may be arranged in the focal plane $F_P$ of the micro-lens array 4. Each pair of aperture 31-33 and lens 41-43 creates a narrow directional light beam with an angular spread α determined by the radius $r_i$ of the aperture 31-33 and the focal distance $f_i$ of the micro-lens 41-43 as described by:

$$\alpha = \sin^{-1}\left(\frac{n_2}{n_1}\sin\left(\tan^{-1}\frac{r_i}{f_i}\right)\right).$$

This equation expresses the beam half-angle α as a function of refractive indices $n_1$ (air) and $n_2$ (lens array), aperture radius $r_i$ and lens focal distance $f_i$. It should be noted that this equation presupposes a situation where the micro-lenses are thick micro-lenses. Embodiments with thin micro-lenses with air spacer or thin micro-lenses with additional glass or light guide spacer (optionally with a different refractive index) are not described with this equation.

Thus, and generally for all embodiments of the invention, in operation light emitted by the light sources 21-26 are mixed in the light mixing element 2 and optionally collimated such as to obtain a beam spread of 2×β' at the array 3 of light extraction elements. This beam spread can be achieved, for instance, by the use of an array of vertical lamellae limiting the beam spread, or by using as a mixing element a light guide with specular light extraction features, or by other means know to a person skilled in the art. In an embodiment, 2×β' equals 2×13 degrees or less. At the cover layer 28 with the array 3 of light extraction elements the light propagating through the diffusely transparent part of the cover layer 28 forms a diffuse output lighting component and light propagating through the light extraction elements 31-33 of the at least one array 3 of light extraction elements forms a directional output lighting component with a beam half-angle α. In an embodiment, the beam half-angle α equals 2 degrees or less. The lens array 4 then forms the two output lighting components into an image that is experienced by the viewer. As used herein, α denotes the beam angle of the light that emerges from the device, while β denotes the beam angle in which the light is focused by the micro-lens (numerical aperture).

FIG. 5 shows a lighting device 101 according to a third embodiment of the invention. The lighting device 101 of FIG. 5 differs from that of FIG. 4 only in the construction of the cover layer 28 and array of light extraction elements 3. In this case the lighting device 101 comprises a collimating glass element 36 provided with a layer or coating 28 and 36 on each of two opposing surfaces facing towards the light sources 21-26 and the micro-lens array 4, respectively. The collimating glass element 36 may for instance be a glass plate/spacer which in combination with coating patterns applied on its planes provide the light collimation functionality.

The coating 28 facing towards the light sources 21-26 forms the cover layer 28, and the coating 36 facing the micro-lens array 4 is a collimator coating. Both coatings 28 and 36 are provided with an array of light extraction elements 31-33. The array of light extraction elements 31-33 of the cover layer 28 and of the collimator coating 36, respectively, may be identical in position and/or shape and/or size or they may be different in position and/or shape and/or size.

Figure 6:
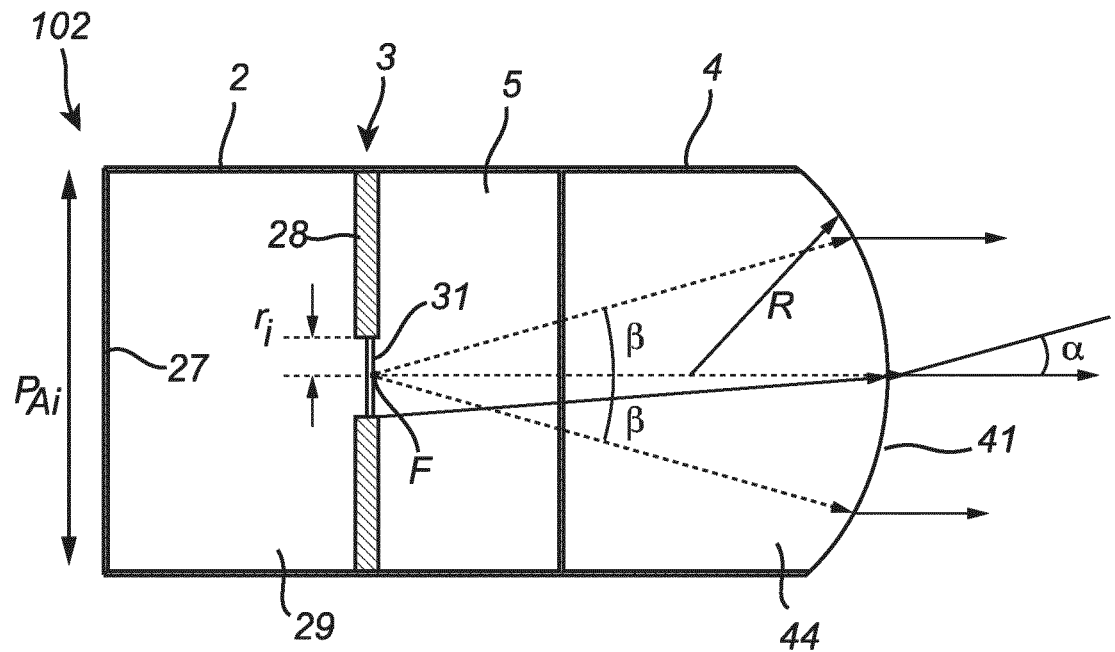
FIG. 6 shows a cross-sectional view of a fourth embodiment of a lighting device according to the invention.

FIG. 6 shows a lighting device 102 according to a fourth embodiment of the invention. The lighting device 102 of FIG. 6 differs from that of FIG. 4 only in virtue of the following features.

The lighting device 102 comprises a light mixing element 2 in the form of a glass material 29 with a coating or layer 28 in which the array of light extraction elements 3 is formed. Furthermore, a spacer glass material 5 is arranged between the array of light extraction elements 3 and the micro-lens array 4. The spacer glass material 5 ensures that the aperture 31 and the focal plane of the micro-lens 41 coincide. I spacer glass material 5 may be used as a light guide to distribute and extract light from a second light source.

Figure 7:
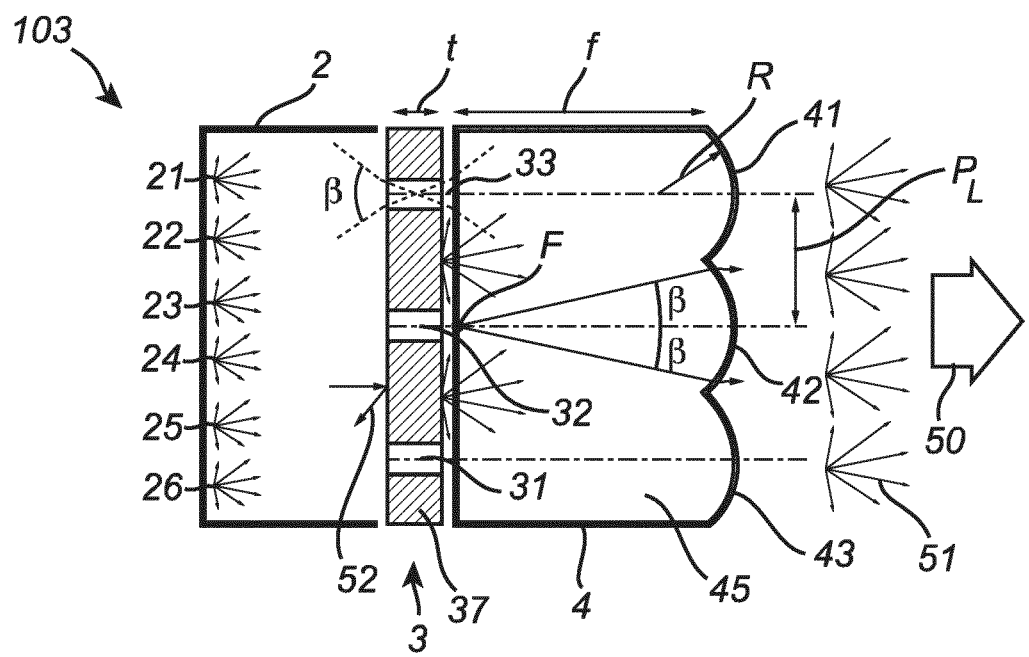
FIG. 7 shows a cross-sectional view of a fifth embodiment of a lighting device according to the invention.

FIG. 7 shows a lighting device 103 according to a fifth embodiment of the invention. The lighting device 103 of FIG. 7 differs from that of FIG. 4 in that the first light generating component 2 is a light guide and that the second light generating component 3 is an array of specular light extraction elements. The lighting device 103 of FIG. 7 further differs from that of FIG. 4 in that a coating which reflects yellow light (arrow 52) and transmits blue light (arrow 51) is provided. This mimics a diffuse blue sky while increasing the efficiency of the directional beam. To this end the lighting device 100' comprises a layer 37 which is transparent for blue light and which reflects yellow light, and which comprises light extraction elements 31, 32, 33. The layer 37 may furthermore provide the transmitted blue light with a diffuse effect. For example, a layer 37 of one or more simple dichroic coatings could transmit blue light and reflect yellow light. The light transmitted through the light extraction elements 31, 32, 33 is emitted as directional white light (arrow 50).

Figure 8:
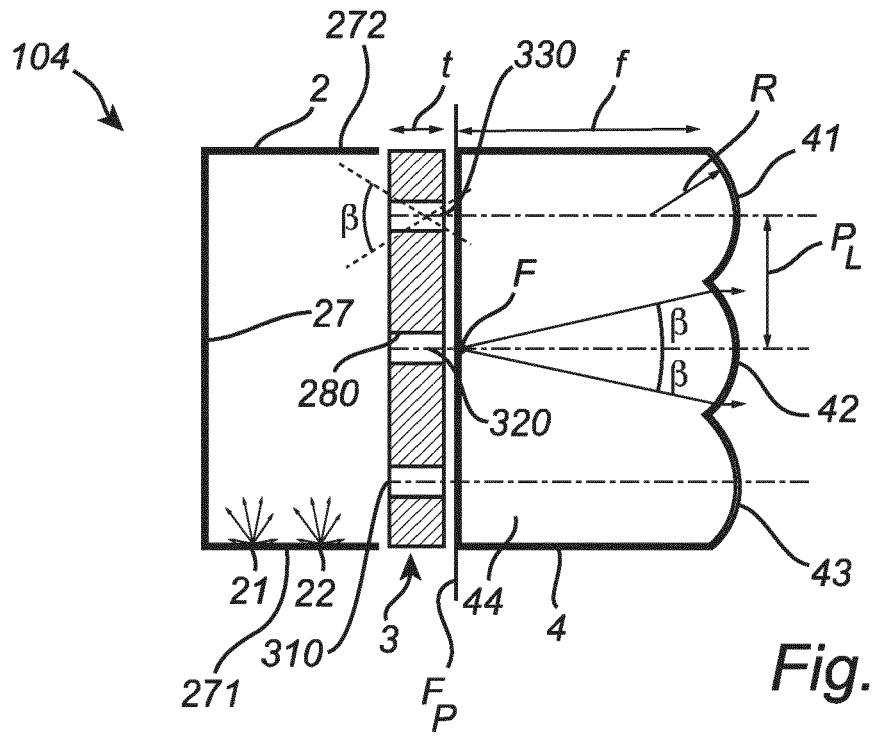
FIG. 8 shows a cross-sectional view of a sixth embodiment of a lighting device according to the invention.

FIG. 8 shows a lighting device 104 according to a sixth embodiment of the invention. The lighting device 104 of FIG. 8 differs from that of FIG. 4 in that the first light generating component 2 is a transparent light guide 2 and that the second light generating component 3 is an array of light out-coupling structures 310, 320, 330 arranged on the transparent light guide 2. Furthermore, the light guide 2 comprises a wall 280 made of a scattering material. In other words, a part of the light guide 2 is in this embodiment made of a scattering material 280. Also, the light guide 2 is side lit, which in practice is obtained by arranging a plurality of light sources 21, 22, typically LEDs, at a side wall 271 or 272 of the light guide 2. As shown in FIG. 8 the light sources 21, 22 are arranged at the lower side wall 271 of the light source 2.

Figure 9:
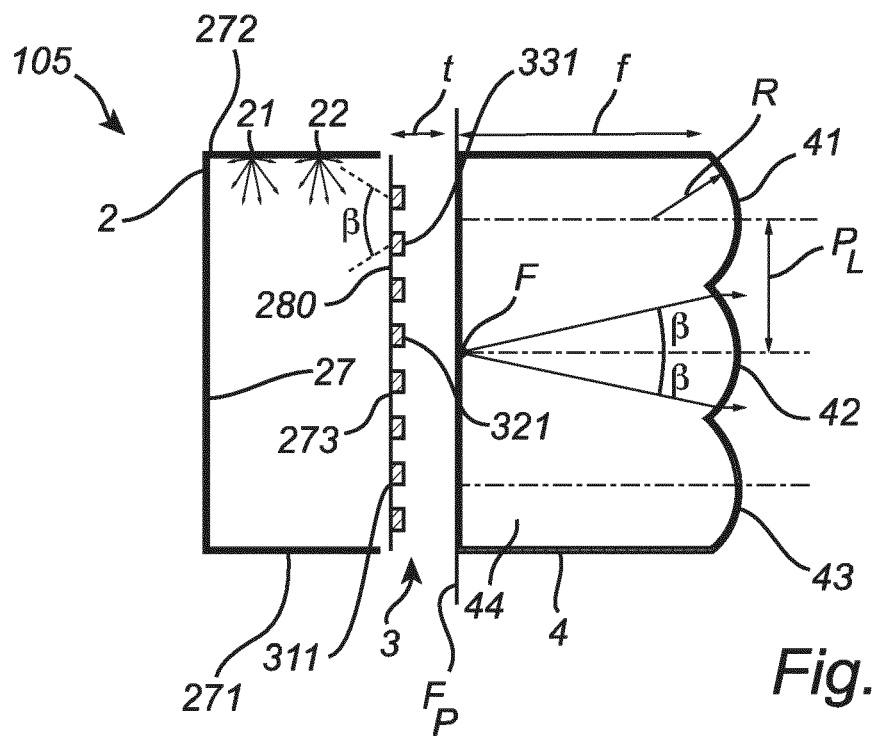
FIG. 9 shows a cross-sectional view of a seventh embodiment of a lighting device according to the invention.

FIG. 9 shows a lighting device 105 according to a seventh embodiment of the invention. The lighting device 105 of FIG. 9 differs from that of FIG. 8 mainly in that the second light generating component 3 here is provided as an array of micro-LEDs or mini-LEDs 311-331. The array of micro-LEDs or mini-LEDs 311-331 are arranged on a wall 273 of the light guide 2 facing towards the array of micro-lenses 4. Furthermore, as shown in FIG. 9 the light sources 21, 22 are arranged at the upper side wall 272 of the light source 2.

Figure 10:
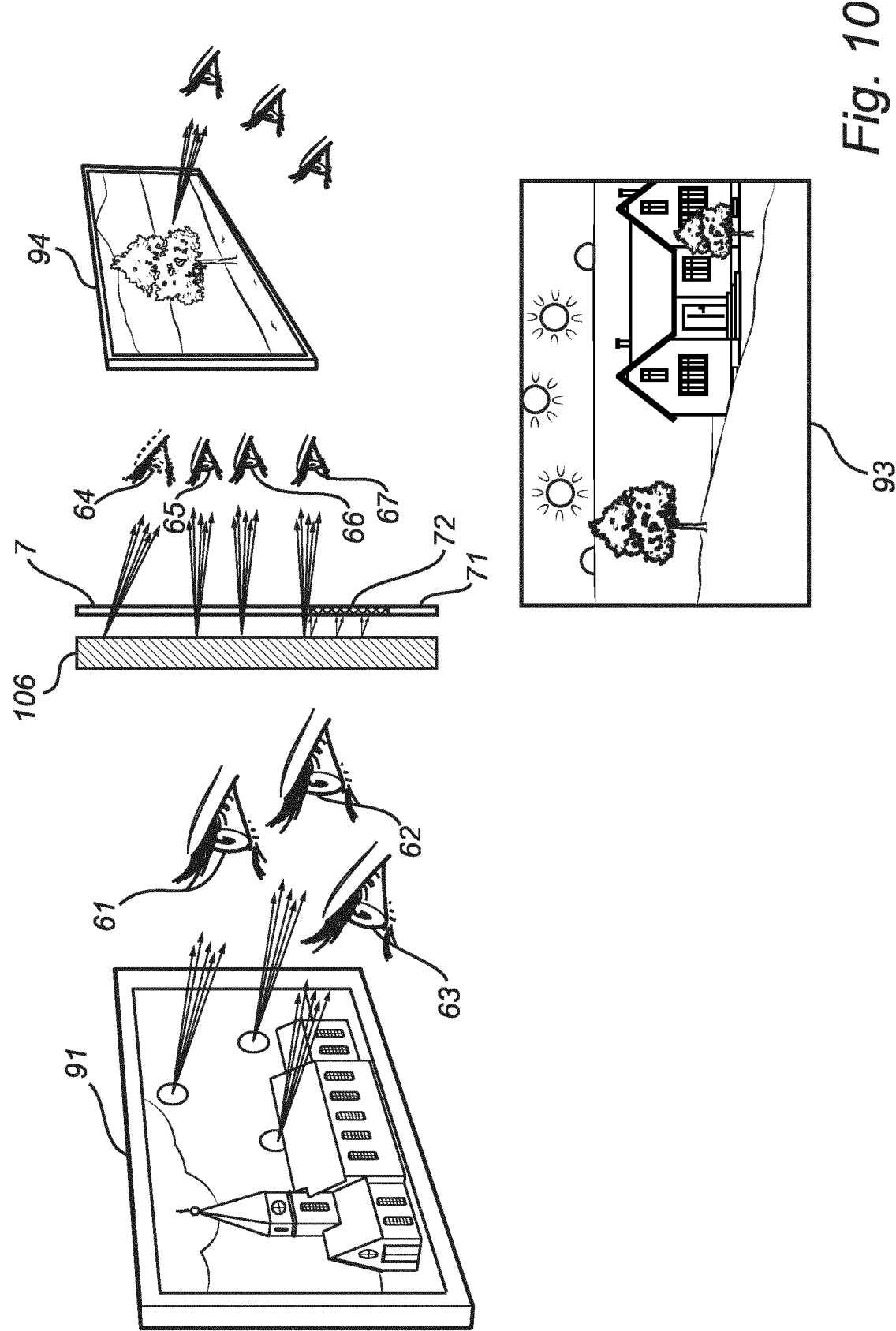
FIG. 10 schematically illustrates moving parallax optics and a possible application of a lighting device according to the invention as well as a lighting device according to the invention and further comprising a cover.

FIG. 10 shows a lighting device 106 according to an eighth embodiment of the invention. The lighting device 106 of FIG. 10 may be a lighting device according to any one of the above or below described embodiments. The lighting device 106 is furthermore provided with a cover 7 which is provided with transparent regions 71 and opaque regions 72. The cover 7 is arranged on the micro-lens array 4. The cover 7 may be a plate, a layer or a coating. Alternatively, the cover 7 may be replaced with a light guide. Such a light guide may be a transparent light guide. Additionally, the transparent light guide may be made of a scattering material. Also, the light guide may be side illuminated by means of LEDs emitting light, such as, but not limited to, blue light.

FIG. 10 furthermore illustrates the eye 64-67 of a viewer observing a lighting device 106 according to the invention from four different positions. The viewer will see only one (or a few) aperture(s); the light from all other light extraction elements does not reach the eye. When moving the view point, e.g. from that of eye 64 to that of eye 66, a different aperture becomes visible, and the initial aperture becomes invisible. This creates the illusion of a moving light source as illustrated at 94, for instance a moving sun/moon/star effect, as well as an enhanced 3D effect as illustrated at 93. When the lighting device is covered by a colored transparency as illustrated at 94, e.g. as in a poster box, the illusion of moving parallax can be enhanced. For instance, in the example of the image 94 of the tree, the leaves and branches will dynamically block the light as the observer walks by.

At 91 a further application is illustrated. When the viewer (eyes 61-63) observes the color transparency 91, which is a transmissive display illuminated from the back by a strongly collimated light source obtained by means of a lighting device according to the invention, a resulting image will display a moving sun illusion, appearing and disappearing depending on the position and movement of the observer.

Figure 11:
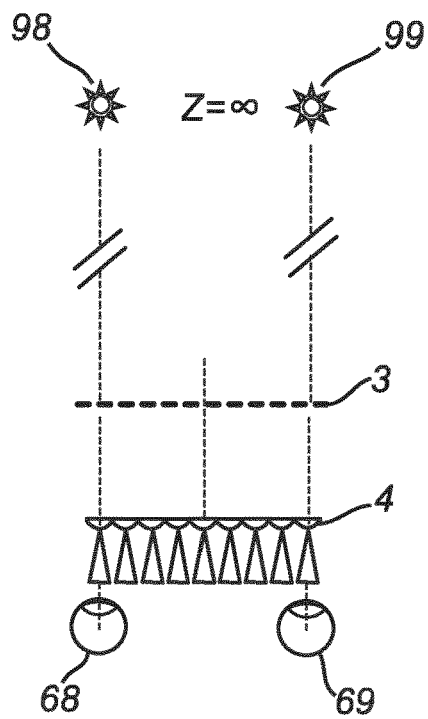
FIG. 11 schematically shows a lighting device according to the invention and configured to provide a virtual image or focus at infinity.
Figure 12:
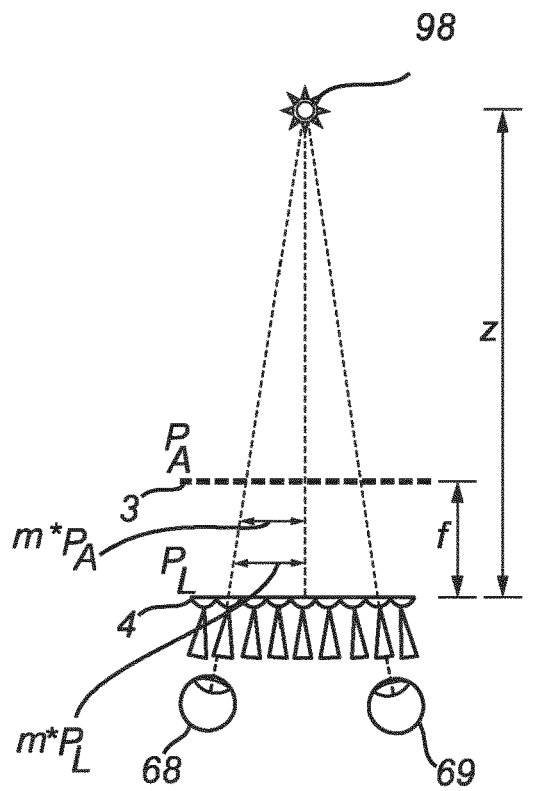
FIG. 12 schematically shows a lighting device according to the invention and configured to provide a virtual image or focus at a distance Z being different from infinity.

FIG. 11 schematically shows a lighting device according to the invention comprising an array of light extraction elements 3 and a micro-lens array 4 and configured to provide a virtual image 98, 99 or focus at infinity. FIG. 12 schematically shows a lighting device according to the invention comprising an array of light extraction elements 3 and a micro-lens array 4 and configured to provide a virtual image 98 or focus at a distance Z being different from infinity. The lighting devices of FIGS. 6 and 7, respectively, may be a lighting device according to any one of the above or below described embodiments.

The initially described problem as experienced by some viewers (eyes 68, 69) is illustrated in FIG. 11. It is noted that the below applies to the light extraction element s and micro-logos alike, and that although the aperture pitch $p_A$ is used in the below by way of example, one might just as well have used the micro-logo pitch $p_M$.

When the pitch, $p_A$, of the array of light extraction elements 3 is chosen equal to the pitch, $p_L$, of the micro-lens array, virtual images are created at infinity. The two eyes 68 and 69 of the observer receive two images and fuse these into one only if the eyes converge at infinity, i.e. if they are parallel. But there is a natural tendency to focus the eyes at closer distance, i.e. where the eyes converge at a distance less than infinity. Thus, the observer may experience difficulties with fusing the two images into one. The design choice to create a virtual image at infinity also implies that the light beams as drawn in FIG. 4 can only be seen when standing right in front of the device, and not when looking at it under some angle.

In contrast, and as shown in FIG. 12, if the pitch, $p_A$, of the array 3 of apertures forming the light extraction elements is chosen to be smaller than the pitch, $p_L$, of the micro-lens array 4 the following applies. From equal angles the following relation holds true:

$$(m*p_A)/(Z-f_a)=(m*p_L)/Z,$$

where m is any integer number, $p_A$ is the pitch of the aperture array, $p_L$ is the pitch of the micro-lens array, $f_a$ is focal length of the micro-lens array in air and Z is the distance from the micro-lens array to the virtual image. From the above equation it follows that the virtual image will appear at a distance $$Z=f_a*1/(1-(p_A/p_L))$$

This is illustrated in FIG. 12. Also, when the observer stands a bit to the right or left of the lighting device, an image can still be seen. This is in contrast to some prior art solutions, where all light beams emerge perpendicular to the device and when observed from an angle no light reaches the eyes.

By way of examples: If $p_A=p_L$, then Z becomes infinity. If $p_A=0.99*p_L$, then Z is 100 times the focal length f. Finally, if $p_A=0.98*p_L$, then Z is 50 times the focal length $f_a$.

In order to have a smooth viewing experience of smooth moving of the image across the lighting device, the angular spread α of the directional light beams need to be equal to or larger than the angular distance in between the individual light beams propagating after each of the micro-lenses of the micro-lens array. For that the following relation need to be fulfilled.

$$(p_L-p_A) \le r_i.$$

Therefore, the aperture pitch and the micro-lens pitch are in some embodiments chosen such as to fulfill the relation $p_A \le p_L$.

Figure 13:
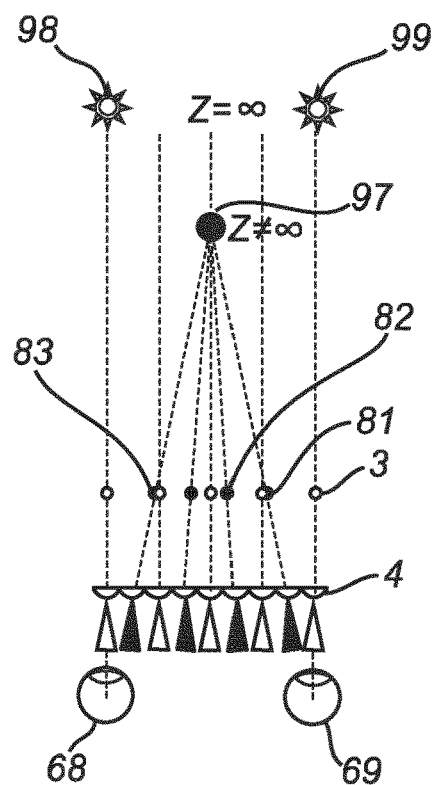
FIG. 13 schematically shows a lighting device according to the invention and configured to provide virtual images at various multiple depths.

FIG. 13 schematically shows a lighting device according to the invention comprising two arrays of elements forming the light extraction elements, namely an array of apertures 3 and an array of micro-logos 81-83, and a micro-lens array 4. The lighting device of FIG. 13 may be a lighting device according to any one of the above described embodiments. The array of apertures 3 has a pitch $p_A$ equal to the pitch $p_L$ of the micro-lens array 4, and consequently the resulting image appears at infinity. The array of micro-logos 81-83 has a smaller pitch $p_M$ than that of the micro-lens array 4, and the resulting image appears closer. The lighting device of FIG. 13 is thus configured to provide by means of the array of apertures 3 a virtual image 98, 99 or focus at a distance Z being equal to infinity, and to provide by means of the array of micro-logos 81-83 a virtual image 97 or focus at a distance Z being different from infinity. Hence, FIG. 13 illustrates how various images 97, 98, 99 can be created at different depths.

Thus, in the embodiment shown in FIG. 13, the cover layer of the lighting device comprises at least an array of apertures and an array of micro-logos with mutually different pitches, $p_A$ and $p_M$. The micro-lens array comprises a micro-lens pitch, $p_L$. Each of the aperture pitch $p_A$ and the micro-logo pitch $p_M$ and the micro-lens pitch $p_L$ are chosen such as to fulfill the relations $p_A \le p_L$ and $p_M \le p_L$.

Furthermore, each of the aperture pitch $p_A$ and the micro-logo pitch $p_M$ and the micro-lens pitch may be chosen such as to fulfill at least one of the relations $(p_L-p_A) \le r_i$ and $(p_L-p_M) \le r_M$, where r is the radius of the apertures and $r_M$ is the radius of the micro-logos, respectively.

FIG. 13 may also be interpreted such as to show a lighting device according to the invention comprising two arrays of micro-logos forming the light extraction elements, namely a first array of micro-logos 3 and a second array of micro-logos 81-83, and a micro-lens array 4. In this case, the first array of micro-logos 3 has a pitch equal to the pitch of the micro-lens array 4, and consequently the resulting image appears at infinity. The second array of micro-logos 81-83 has a smaller pitch than that of the micro-lens array 4, and the resulting image appears closer. The lighting device of FIG. 13 is thus analogously to the first described interpretation configured to provide by means of the first array of micro-logos 3 a virtual image 98, 99 or focus at a distance Z being equal to infinity, and to provide by means of the second array of micro-logos 81-83 a virtual image 97 or focus at a distance Z being different from infinity. Hence, FIG. 13 still illustrates how various images 97, 98, 99 can be created at different depths.

Thus, according to this alternate interpretation of the embodiment shown in FIG. 13, the cover layer of the lighting device comprises at least two arrays of micro-logos with different micro-logo pitches, $p_{Mi}$, where i denotes the number of the array of micro-logos and i is an integer being 1 or more. The micro-lens array comprises a micro-lens pitch, $p_L$. Each of the micro-logos pitches and the micro-lens pitch are chosen such as to fulfill the relation $p_{Mi} \le p_L$. Furthermore, each of the micro-logo pitches and the micro-lens pitch may be chosen such as to fulfill the relation $(p_L - p_{Mi}) \le r_i$, where r is the radius of the micro-logos and i denotes the number of the array of apertures and i is an integer being 1 or more.

To create an effect of moving sun with changing color temperature (e.g. lower correlated color temperature (CCT) when viewed from the large angles and higher CCT viewing from right in front of the lighting device) the light mixing element 2 may in an embodiment be provided with a non-uniform but smooth spatial color or CCT distribution. This can be realized e.g. by employing LEDs with different CCTs positioned differently on a substrate, such as a PCB, and covered with a diffuser plate.

Also, a 3D effect may be generated. When using simple round apertures, all of the same shape, such a 3D effect is not exploited. But with an array of shapes, like printed 3D-views of a 3D object, each eye will see a different 3D-view, and a 3D image results. The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

List of Variable Sizes

α Beam half angle (angular spread) of a light beam having propagated through a pair of aperture and lens
β Acceptance angle of the micro-lenses of the micro-lens array
$f_a$ Focal distance of the micro-lens array in air
$f_i$ Focal distance of the micro-lens array
F Focal point of the micro-lens array
$F_P$ Focal plane of the micro-lens array
g Size of gap
i Integer number, i≥1
m Any integer number
$n_1$ Refractive index of air
$n_2$ Refractive index of micro-lens array
$p_{Ai}$ Pitch of $i^{th}$ aperture
$p_{Mi}$ Pitch of $i^{th}$ micro-logo array
$p_L$ Pitch of micro-lens array
$r_i$ Radius of the aperture
t Thickness of array of light extraction elements/collimator
R Radius of curvature of lens of micro-lens array
Z Distance to virtual image

LIST OF REFERENCE NUMERALS 1, 10, 100, 100', 101-105 Lighting device
2 Light mixing element
21-26 Light Sources
27 Bottom of light mixing element
271-273 Sides of light guide
28 Diffusive layer with light extraction elements
280 Scattering material
29 Aperture glass
3, 3' Array of light extraction elements
31-33 Light extraction elements
310-330 Light out-coupling structures
311-331 Array of micro-LEDs
34 Collimator
35 Collimator glass
36 Collimator coating
37 Layer
4 Micro-lens array
41-43 Micro-lenses
44 Micro-lens glass
45 Micro-lens polymer
5 Spacer glass
50-52 Arrows
61-67 Eye(s) of the viewer
68 Left eye of the viewer
69 Right eye of the viewer
7 Cover layer
8 Light guide
81-83 Array of micro-logos
84 Transparent element
85 Gap
86 Light blocking element
91 Display
92 Display as seen by the viewer
93 Virtual 3D image as created by lighting device
94 Image of tree
97-99 Virtual images

The invention claimed is:

1. A lighting device comprising:
a light generating element, and
a micro-lens array comprising a focal plane,
wherein the light generating element is arranged to emit a light output towards the micro-lens array,
wherein the light generating element comprises any one of or both of a first light generating component and a second light generating component,
wherein the first light generating component comprises a light emitting surface adapted for providing a diffuse light output component,
wherein the second light generating component comprises at least one array of light sources adapted for providing a directional light output component,
wherein the light output is formed by any one of the diffuse light output component, the directional light output component and a superposition of the diffuse light output component and the directional light output component, respectively,
wherein the lighting device further comprises an array of micro-logos located between the light generating element and the micro-lens array,
wherein the array of micro-logos is located in the focal plane ($F_p$) of the micro-lens array, and
wherein the at least one array of light sources comprises the array of micro-logos.

2. A lighting device according to claim 1, wherein the lighting device comprises at least two arrays of micro-logos with mutually different micro-logo pitches, $p_{Mi}$, where i denotes the number of the array of apertures and i is an integer being 1 or more.

3. A lighting device according to claim 1, wherein the micro-lens array comprises a micro-lens pitch, $p_L$, wherein the array, or each array, of micro-logos comprises a micro-logo pitch $p_{Mi}$, and wherein the micro-logo pitch, or each of the micro-logo pitches, is equal to or smaller than the micro-lens pitch.

4. A lighting device according to claim 1, and further comprising a light blocking structure configured and arranged to suppress cross-talk.

5. A lighting device according to claim 1, wherein the lighting device further comprises an optical element configured and arranged to provide switchable polarized light, and wherein the array micro-logos is a polarization sensitive micro-logo array.

6. A lighting device according to claim 1, wherein the at least one array of light sources comprises a transparent element with the array of micro-logos formed thereon.

7. A lighting device according to claim 1, wherein the lighting device further comprises an array of micro-LEDs or mini-LEDs, and wherein each micro-LED or mini-LED of the array of micro-LEDs or mini-LEDs are covered with a logo or are shaped as a logo, the array of micro-LEDs or mini-LEDs thus forming the array of micro-logos.

8. A lighting device according to claim 1, wherein the first light generating component is a transparent light guide, and wherein at least a part of the transparent light guide is made of a scattering material.

9. A lighting device according to claim 8, wherein the cover layer comprising an array of light extraction elements is a semi-transparent collimating element comprising a collimating glass element.

10. A lighting device according to claim 1, and further comprising at least one light source adapted for, in operation, emitting light, wherein
the first light generating component comprises a light mixing element in which the at least one light source is arranged, wherein
the light emitting surface is a cover layer forming part of light mixing element, the cover layer being arranged downstream of the at least one light source, wherein
the micro-lens array is arranged downstream of the cover layer, and wherein
the cover layer of the light mixing element is a diffusely transparent layer.

11. A lighting device according to claim 1, wherein the micro-logos of the array of micro-logos comprise:
at least two mutually different shapes, and/or
at least two mutually different sizes.

12. A lighting device according to claim 1, wherein the micro-lens array is covered by a transparent light guide, the transparent light guide forming the first light generating component, wherein the transparent light guide is side illuminated by means of LEDs emitting blue light, and wherein the array of light sources is an array of specular light extraction elements comprising the array of micro-logos, or
wherein the first light generating component is a transparent light guide, wherein at least a part of the transparent light guide is made of a scattering material, wherein the transparent light guide is side lit, and wherein the array of light sources is an array of light out-coupling structures arranged on the transparent light guide and comprising the array of micro-logos.

13. A lighting device according to claim 1, wherein the lighting device is any one of a luminaire, an office ceiling lighting device, a wall lighting device, a hospitality lighting device, a retail lighting device, a lighting device configured for confined spaces outside view and a lighting device for advertising purposes, showing the features of an AD campaign, or dynamically changing text.

* * * * *